US006792542B1

(12) United States Patent
Lee et al.

(10) Patent No.: US 6,792,542 B1
(45) Date of Patent: Sep. 14, 2004

(54) DIGITAL SYSTEM FOR EMBEDDING A PSEUDO-RANDOMLY MODULATED AUXILIARY DATA SEQUENCE IN DIGITAL SAMPLES

(75) Inventors: Chong U. Lee, San Diego, CA (US); Katherine S. Lam, San Diego, CA (US); Julien J. Nicolas, San Diego, CA (US); Edward Atrero, San Diego, CA (US)

(73) Assignee: Verance Corporation, San Diego, CA (US)

( * ) Notice: Subject to any disclaimer, the term of this patent is extended or adjusted under 35 U.S.C. 154(b) by 327 days.

(21) Appl. No.: 09/708,810

(22) Filed: Nov. 8, 2000

Related U.S. Application Data

(63) Continuation of application No. PCT/US99/08675, filed on Apr. 20, 1999.
(60) Provisional application No. 60/085,186, filed on May 12, 1998.

(51) Int. Cl.[7] .................................................. G06K 9/00
(52) U.S. Cl. .......................................... 713/200; 380/2
(58) Field of Search ............................... 713/176, 193, 713/160, 220; 382/100, 232; 380/2

(56) References Cited

U.S. PATENT DOCUMENTS

| | | | |
|---|---|---|---|
| 4,546,342 A | | 10/1985 | Weaver et al. |
| 4,621,334 A | * | 11/1986 | Garcia ........................ 382/115 |
| 4,750,173 A | * | 6/1988 | Bluthgen ..................... 370/528 |
| 4,839,843 A | * | 6/1989 | Veldhuis ..................... 708/314 |
| 5,146,457 A | | 9/1992 | Veldhuis et al. |
| 5,479,168 A | | 12/1995 | Johnson et al. |

(List continued on next page.)

FOREIGN PATENT DOCUMENTS

| | | |
|---|---|---|
| EP | 0 058 482 | 6/1985 |
| EP | 0 359 325 | 3/1990 |

(List continued on next page.)

OTHER PUBLICATIONS

G. Voyatzis, N. Nikolaidis and I. Pitas, Digital Image Watermarking: an Overview, Int. Conf. on Multimedia Computing and Systems (ICMCS'99), Florence, Italy, Jun. 7–11, 1999, vol. 1 pp. 1–6.*

(List continued on next page.)

*Primary Examiner*—Meng-Al T. An
*Assistant Examiner*—Nilesh Shah
(74) *Attorney, Agent, or Firm*—Barry R. Lipsitz; Douglas M. McAllister

(57) ABSTRACT

A system for embedding auxiliary digital information ($D_i$) into an existing primary digitally encoded signal ($X_n$) to form an unobjectionable composite digital signal ($C_n$). Auxiliary data bits ($D_i$) modulate a pseudo-random (e.g., PN) sequence (125) to provide an auxiliary data sequence (160) that is used to modify the Least Perceptually Significant Bits (LPSBs) (180) of successive multi-bit samples (120) of the primary signal. In a cross-term compensation embodiment (300, 400, 1000), a correlation (V) between the PN sequence and the sample bits is determined, and compared to the auxiliary data bits ($D_i$) to determine whether there is a desired correspondence. The LPSBs in the samples are toggled (360), if necessary, to provide the desired correspondence. The selection of LPSBs to modify accounts for a desired noise level of the auxiliary data ($D_i$) in the primary signal ($X_n$). LPSBs may be selected to be modified based on a sparse PN sequence (250) to achieve the desired noise level and to conceal the presence of the auxiliary data ($D_i$). The data to be hidden can be any digital data, while the primary signal is any uncompressed or compressed digitally sampled process, including, for example, audio or video data.

16 Claims, 10 Drawing Sheets

U.S. PATENT DOCUMENTS

| | | | |
|---|---|---|---|
| 5,638,074 A | | 6/1997 | Johnson |
| 5,640,161 A | * | 6/1997 | Johnson et al. ............. 341/122 |
| 5,649,054 A | | 7/1997 | Oomen et al. |
| 5,673,291 A | | 9/1997 | Dent |
| 5,768,426 A | * | 6/1998 | Rhoads ....................... 382/232 |
| 5,809,139 A | * | 9/1998 | Girod et al. ................. 380/202 |
| 5,822,360 A | | 10/1998 | Lee et al. |
| 5,970,100 A | * | 10/1999 | Olafsson et al. ............ 375/296 |
| 6,222,932 B1 | * | 4/2001 | Rao et al. ................... 382/100 |

FOREIGN PATENT DOCUMENTS

| | | |
|---|---|---|
| EP | 0 372 601 | 2/1995 |
| EP | 0 762 417 | 3/1997 |
| WO | WO 98/08915 | 9/1989 |
| WO | WO 92/22060 | 12/1992 |
| WO | WO 94/18762 | 8/1994 |
| WO | WO 97/09797 | 3/1997 |
| WO | WO 98/37641 | 8/1998 |

OTHER PUBLICATIONS

P. Bassia, Ioannis Pitas Robust Audio Watermarking in the time–domain, EUSIPCO'98,–Ninth European Signal Processing Conference, Sep. 8–11. 1998.*

Marvel, L. M., Charles G. Boncelet, Charles T. Retter. Reliable Blind Information Hiding for Images, IHW'98— Proc. of the International Information hiding Workshop, Apr. 1998.*

R.G. Van Schyndel, A.Z. Tirkel, C.F. A digital Watermark, 1994, Osborne International Conference on Image Processing.*

Joshua R. Smith, Barrett O. Modulation and information Hiding in Images, 1996, Comiskey Workshop on Information Hiding.*

N. Jacobsen, K. Solanki, U. Madhow, B. S. Manjunath, S. Chandrasekaran, Image Adaptive High Volume Data Hiding Based on Scalar Quantization, 2000.*

L. Bouney, A. Tewfik, K. Hamdy Digital Watermarks For Audio Signals (1996) International Conference on Multimedia Computing and Systems.*

*Patent Abstracts of Japan,* Publication No. 01091376, "Auxiliary Information Recording Method", Apr. 11, 1989 (one page).

Eastty, Peter, "An Inaudible Buried Data Channel in Digital Audio: A Development Using Advanced Software Tools", AES, Los Angeles, Nov. 8–11, 1996.

Gerzon, M. and Craven, P., "A High–Rate Buried Data Channel For Audio CD", AES, Berlin, Mar. 16–19, 1993.

Chew, J.R., "Simultaneous Subliminal Signalling in Conventional Sound Circuits: A Feasibility Study", BBC Research Department Report No. 1971/1, Jan. 1971.

* cited by examiner

DIGITAL SYSTEM FOR EMBEDDING A PSEUDO-RANDOMLY MODULATED AUXILIARY DATA SEQUENCE IN DIGITAL SAMPLES

This application claims the benefit of U.S. Provisional Application No. 60/085,186, filed May 12, 1998 which is continuation of PCT/US 99/08675 filed Apr. 20, 1999.

BACKGROUND OF THE INVENTION

The present invention relates to a method and apparatus for carrying auxiliary data in a digital signal, such as an audio or video signal, without affecting the perceived quality of the signal. For example, the invention is suitable for use with digital broadcast streams and digital storage media, such as compact discs (CDs) and digital video discs (DVDs).

Schemes for communicating and storing digital data have become increasingly popular, particularly in the mass consumer market for digital audio, video, and other data. Consumers may now send, receive, store, and manipulate digital television, audio and other data content, such as computer games and other software, stock ticker data, weather data and the like. This trend is expected to continue with the integration of telephone, television and computer network resources.

However, in many cases it is desirable to control or monitor the use of such digital data. In particular, copyright holders and other proprietary interests have the right to control the distribution and use of their works, including audio, video and literary works.

Additionally, in many cases it is desirable to provide auxiliary data that provides information on a related digital signal. For example, for a musical audio track, it would be useful to provide data that indicates the name of the artist, title of the track, and so forth. As a further example, it would be useful to provide data for enforcing a rating system for audio/video content.

Other times, the auxiliary data need not be related to the primary data signal in which it is carried.

Furthermore, it would be desirable if the auxiliary data could be embedded into (e.g., carried with) the digital audio, video or other content (termed a "primary data signal") without noticeably degrading the quality of the primary data signal.

Commonly-assigned U.S. Pat. No. 5,822,360, entitled "Method and Apparatus for Transporting Auxiliary Data in Audio Signals", incorporated herein by reference, discloses a scheme for creating a hidden or auxiliary channel in a primary audio, video or other digital signal by exploiting the limits of human auditory or visual perception. With this scheme, a pseudorandom noise carrier is modulated by the auxiliary information to provide a spread spectrum signal carrying the auxiliary information. A carrier portion of the spread spectrum signal is then spectrally shaped to simulate the spectral shape of a primary (e.g., audio) signal. The spread spectrum signal is then combined with the audio signal to produce an output signal carrying the auxiliary information as random noise in the audio signal.

However, it would be desirable to provide auxiliary data in a primary data signal by using the primary data signal itself rather than carrying additional bits in a separate auxiliary data signal.

In particular, it would be desirable to provide a system for embedding a plurality of auxiliary digital information bits into an existing primary digitally encoded signal to form an unobjectionable composite digital signal. The signal should be unobjectionable in that the auxiliary data is imperceptible to the casual listener, viewer, or user, or otherwise provided at a desired threshold level, whether imperceptible or not, in the primary data signal.

The system should alter some of the primary signal's lower order bits to insert the auxiliary, hidden digital data. It would further be desirable for the data to be hidden to be any conceivable digital data, and for the primary signal to be any digitally sampled process.

It would be desirable if the auxiliary digital information bits could be embedded into an existing primary signal at any time, including, for example, when the primary data signal is created (e.g., during a recording session for an audio track), when the primary data signal is being distributed (e.g., during a broadcast, or during manufacture of multiple storage media such as compact discs), and when the primary data signal is being played (e.g., on a player in a consumer's home).

It would also be desirable to manipulate a minimal number of bits in a primary data signal in order to carry the auxiliary data.

It would be desirable to provide approximate spectral shaping of the embedded data.

It would be desirable to provide dynamic and perceptual-based schemes for embedding data.

It would be desirable to provide the capability to embed the data in the compressed or uncompressed domain.

The present invention provides a system having the above and other advantages.

SUMMARY OF THE INVENTION

The system, termed "Digital Hidden Data Transport (DHDT)", employs a noise-like information bearing signal, termed an auxiliary data sequence, that comprises auxiliary, hidden digital data. The auxiliary digital data to be combined with the primary signal is a low-level digital signal. Due to its low-level, this signal is usually imperceptible to the casual listener, viewer, or user, assuming that the primary signal has a large enough dynamic range. For example, for CD audio, the dynamic range of the primary signal is typically sixteen bits.

However, for high definition applications (such as DVD audio), the noise introduced by indiscriminate manipulation of the least perceptually significant bits (LPSBs) may be objectionable (e.g., perceptible or otherwise above a desired level). Therefore, it may be desirable to minimize the manipulation of the LPSBs. The present invention provides mechanisms for minimizing the. manipulation of lower order bits for reliably transporting the hidden data.

The invention is able to exploit human perception by manipulating lower order bits of digital samples of a primary data signal. Manipulation of the lower order bits generally has little or no impact on the perceptual quality of the primary data signal (e.g., audio or video).

A primary signal comprising digital audio is usually formed from successive samples, each having sixteen to twenty-four bits, for example. Assuming the bits are arranged in two's complement notation, the highest order significant bit affects the sound of the samples the most. The next lower bit has less of an effect, and so on. The lowest order bits are less audible (or visible for video and still imagery) and can therefore be manipulated to hide digital information without noticeably degrading the overall quality of the primary data signal.

These low order bits that have negligible impact when they are perturbed are termed least perceptually significant bits (LPSBs). The LPSBs are essentially the least significant bits (LSBs). None, some or all of the bits in each sample of the primary signal can be used as LPSBs. However, in most applications, the number of LPSBs is much less than the number of bits (K) in each sample. For example, for a typical, digitally sampled audio signal with sixteen bits of dynamic range, one or two LPSBs may be used in each sample. The optimum number of LPSBs to use can be determined by experimentation to attain a desired perceptibility level.

Moreover, the number of manipulated LPSBs can vary for each sample.

To securely embed auxiliary data into a primary signal (e.g., in a carrier wave), the least perceptually significant bits are pseudo-randomly modulated. For example, a pseudo-random sequence may be modulated by an auxiliary data bit to provide an auxiliary data sequence that is less likely to be extracted by an unauthorized person (e.g., attacker). Generally, if the attacker does not know the sequence used at the encoder, the attacker will not be able to demodulate the hidden data or restore the primary signal.

A decoder end of the system may have support for self-synchronization. Generally, the decoder's version of the PN sequence will not be correctly aligned in time with the encoder's PN sequence. The correct time alignment is necessary for the decoder to demodulate the data properly. This is analogous to the problem of coherent demodulation in a receiver. Self-synchronization is therefore an important element of the system.

A decoder may be able to synchronize with the received data in some case, for example, if the decoder knows the frame boundaries. This may occur, e.g., when recovering frames from a DVD or other storage media, where the data is recovered starting at the beginning of a frame. Or, the decoder may be provided with the necessary synchronization information via a separate channel, or by other means. In these cases, a self-synchronization capability in the decoder is not required.

To meet the requirement of self-synchronization, the system embeds a check code, such as a Cyclic Redundancy Check (CRC) code, that allows a decoder to synchronize itself to the modulating sequence. CRC codes are frequently used in communications systems for error control. However, in most systems, CRC codes are used to check if the data was received error-free, not for the purpose of synchronization.

In one embodiment, a method for embedding an auxiliary data bit in a plurality of digital samples includes the steps of: (a) modulating a pseudo-random sequence by the auxiliary data bit to provide a pseudo-randomly modulated auxiliary data sequence, and (b) embedding the auxiliary data sequence in the plurality of samples by modifying at least one least perceptually significant bit (LPSB) of each of the plurality of samples according to the auxiliary data sequence to provide a composite signal with the auxiliary data bit embedded therein. Each sample has a plurality of bits, and a number of the LPSBs to replace in each of the samples is determined according to a desired perceptibility level of the auxiliary data sequence in the composite signal.

A corresponding decoding method, and encoding and decoding apparatuses are presented.

In a second embodiment, a method for embedding an auxiliary data bit in a plurality of samples of a digital composite signal includes the step of: (a.1) multiplying a least perceptually significant bit (LPSB) in each of the plurality of samples by a pseudo-random sequence to provide a corresponding plurality of multiplication values, and (a.2) accumulating the plurality of multiplication values to obtain a correlation value. The correlation value is the correlation of the PN sequence and the LPSB.

The method includes the further step of (b) comparing the correlation value to a value of the auxiliary data bit to determine a correspondence therebetween. If the comparing step (b) indicates an undesired correspondence, at least one of the LPSBs is toggled to provide the desired correspondence, and the plurality of samples with the at least one toggled LPSB is used to provide a composite signal where the LPSBs, including the at least one toggled LPSB, identify the auxiliary data bit.

If the comparing step (b) indicates a desired correspondence, the plurality of samples is passed through with the associated LPSBs unchanged to provide a composite signal where the unchanged LPSBs identify the auxiliary data bit.

A corresponding decoding method, and encoding and decoding apparatuses are presented.

A data signal embodied in a carrier wave is also presented. The data signal includes a primary data signal portion comprising a plurality of samples, and an auxiliary data sequence portion.

In one embodiment, an auxiliary data bit modulates a pseudo-random sequence to provide the auxiliary data sequence portion. The auxiliary data sequence modifies at least one LPSB of each of the plurality of samples. Moreover, a number of LPSBs that is modified in each of the samples is determined according to a desired perceptibility level of the auxiliary data bit in the composite signal.

In another embodiment of the data signal, an LPSB in each of the plurality of samples is multiplied by a pseudo-random sequence to provide a corresponding plurality of multiplication values. The values are accumulated to obtain a correlation value, and the correlation value is compared to a value of the auxiliary data bit to determine a correspondence therebetween. At least one of the LPSBs is toggled to provide the desired correspondence.

DETAILED DESCRIPTION OF THE INVENTION

The present invention relates to a method and apparatus for embedding auxiliary data into a digital signal by modifying bits of the primary data signal. In particular, the "least perceptually significant bits (LPSBs)" of the primary data signal, described below in greater detail, are perturbed (e.g., modified) to carry the auxiliary data.

The terms "random" and pseudo-random" are generally used interchangeably herein.

Figure 1:
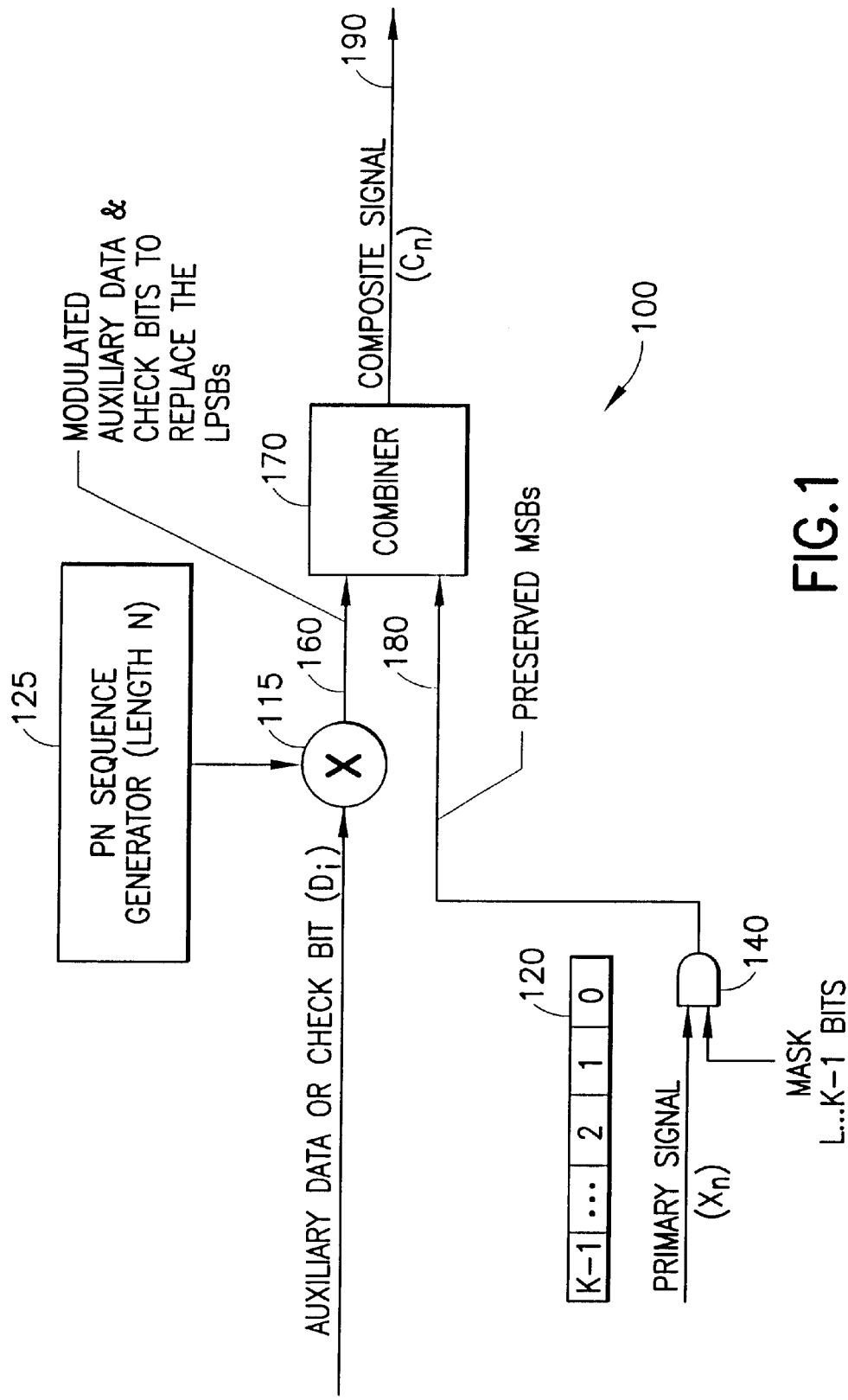
FIG. 1 illustrates a general DHDT encoder in accordance with the present invention.

FIG. 1 illustrates a general DHDT encoder in accordance with the present invention. This figure shows the embedding of one or more auxiliary data bits into a primary signal.

The encoder is shown generally at 100. Auxiliary data and check bits, e.g., zeros or ones, are provided, one at a time, to a modulator 115, where they modulate a pseudo-random (e.g., pseudo-noise or PN) chip sequence of length N provided by a PN sequence generator 125. The output of the modulator 115 may be considered to be an auxiliary data sequence or CRC check bit sequence that comprises several (e.g., 50–200 or more) PN chips. The modulator 115 may comprise a modulo-2 adder.

The auxiliary data or check bits are designated $D_i$, where i=1, 2, . . . is a bit index for the auxiliary data and check bits. Generally, an auxiliary data message to be embedded will comprise many successive bits. Accordingly, the bits provided to the modulator 115 may be extracted, one by one, from a frame of auxiliary data bits using known techniques.

Pseudo-random modulation adds a measure of security to the auxiliary data sequence because the same PN sequence used at the encoder 100 is needed at the decoder to recover the auxiliary data and check bits. This is analogous to direct-sequence spread spectrum techniques used in digital communications.

Primary data signal samples with K bits of resolution (e.g., K bits per sample) are provided to an AND function 140, for ANDing with a mask bit pattern. Each sample, shown generally at 120, includes bit positions 0, 1, . . . , K−1, where 0 is the LSB and K−1 is the MSB.

A number of successive samples are provided to the AND function 140. The mask bit pattern, which is ANDed with each of the successive samples, comprises 0's for the first L positions, starting at the least significant bit (LSB), and 1's for the remaining bits. L is the bit depth, or number of LPSBs that are used to carry the auxiliary data and check bits. L may vary from sample to sample. The output of the AND function 140 on line 180 comprises successive masked samples with 0's in the first L positions, and the original unaltered bits of the primary data signal samples in the remaining positions (e.g., the sample bits to be preserved).

The auxiliary data or check bit sequence is provided to a combiner function 170 via a line 160 to replace (e.g., modify) the corresponding LPSBs of the samples and combined with the preserved MSBs on line 180. In particular, the chips of the auxiliary data or check bit sequence are used to modify the LPSBs for each sample to form a composite signal on a line 190. The auxiliary data bits are now said to be embedded into the LPSBs bits of the composite signal.

N auxiliary data and CRC check bit chips replace N LPSBs in the primary data signal samples. For example, if L=2 LPSBs are to be replaced in each sample, then N/L samples are required to embed a single auxiliary data bit. As shown at the sample 120, the bit position in the sample is assumed to range from 0 to K−1, or 0 to 9, starting from the LPSBs. For example, assume the first sample has the bits $1_9 0_8 0_7 1_6 0_5 0_4 1_3 1_2 1_1 0_0$, where the subscript denotes the bit position. Then, the mask bit pattern provided to the AND function 140 for each sample is 1111111100. The output on line 180 is 1001001100 since ANDing the bits $0_0$ and $1_1$ with 0 and 0, respectively, yields 0 and 0. The mask therefore preserves the bits in positions 2 (L) through 9 (K−1). For each successive sample, only the sample bits in positions 0 and 1 are replaced at the OR function 170.

Although L=2 LPSBs was assumed in the above example, in a general case, N modulated chips are mapped to N samples, where each chip modifies the LPSBs of the corresponding sample regardless of the number of LPSBs in the sample.

Figure 6:
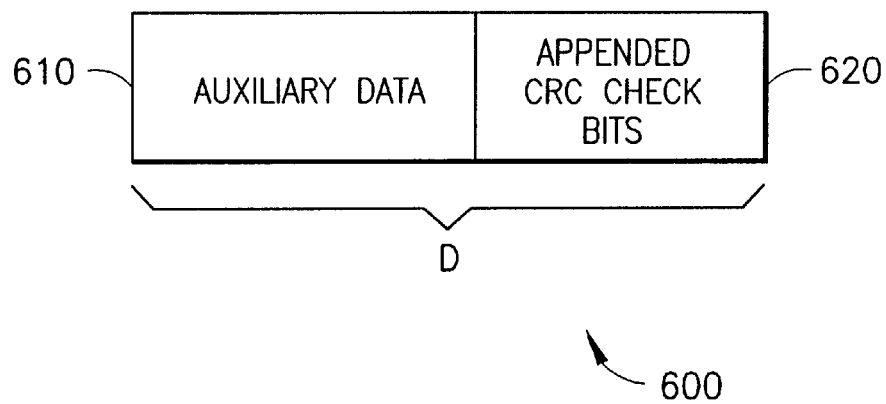
FIG. 6 illustrates an auxiliary data frame in accordance with the present invention.
Figure 7:
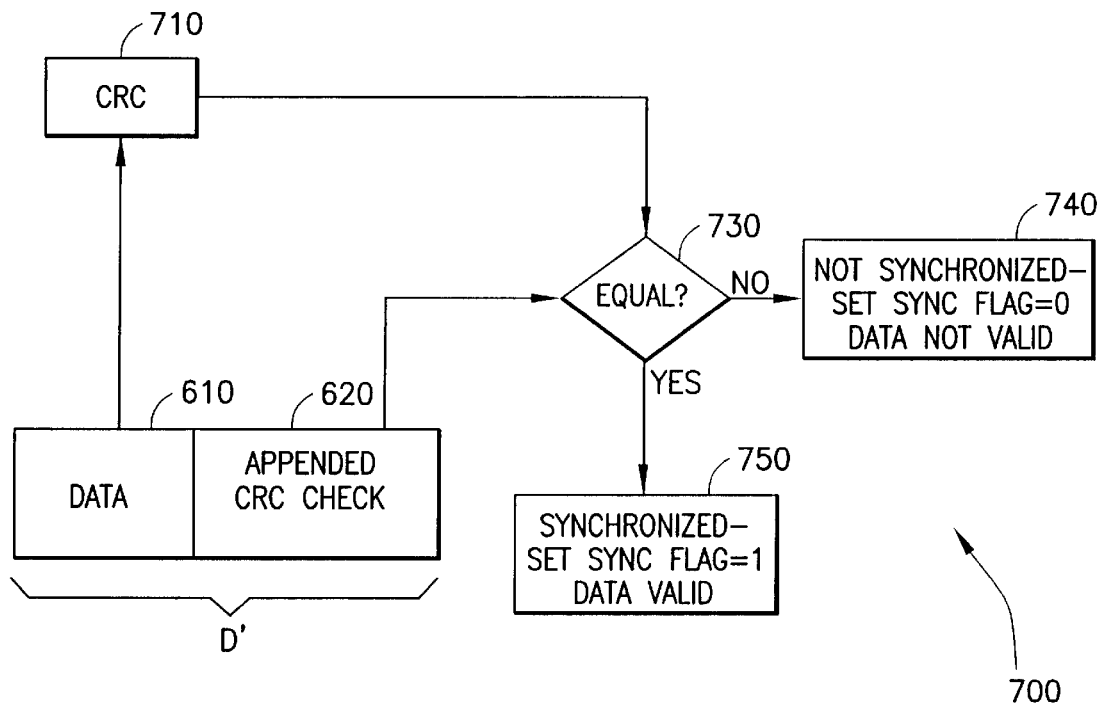
FIG. 7 illustrates a self-synchronization module in accordance with the present invention.

The ratio of auxiliary data bits to check bits can vary based on the check scheme used, as discussed further in connection with FIGS. 6 and 7.

Note that the circuitry shown in FIG. 1 and in the other figures herein, such as the AND function 140, is only one of many possible ways to implement the invention. Virtually any known hardware, firmware and/or software techniques may be used to achieve the desired result.

The composite signal on line 190 may be for digital broadcast, stored on a storage media, such as a CD or DVD, or otherwise distributed, for example, over a computer network (such as the Internet) or a television network (including cable and satellite networks).

Figure 2:
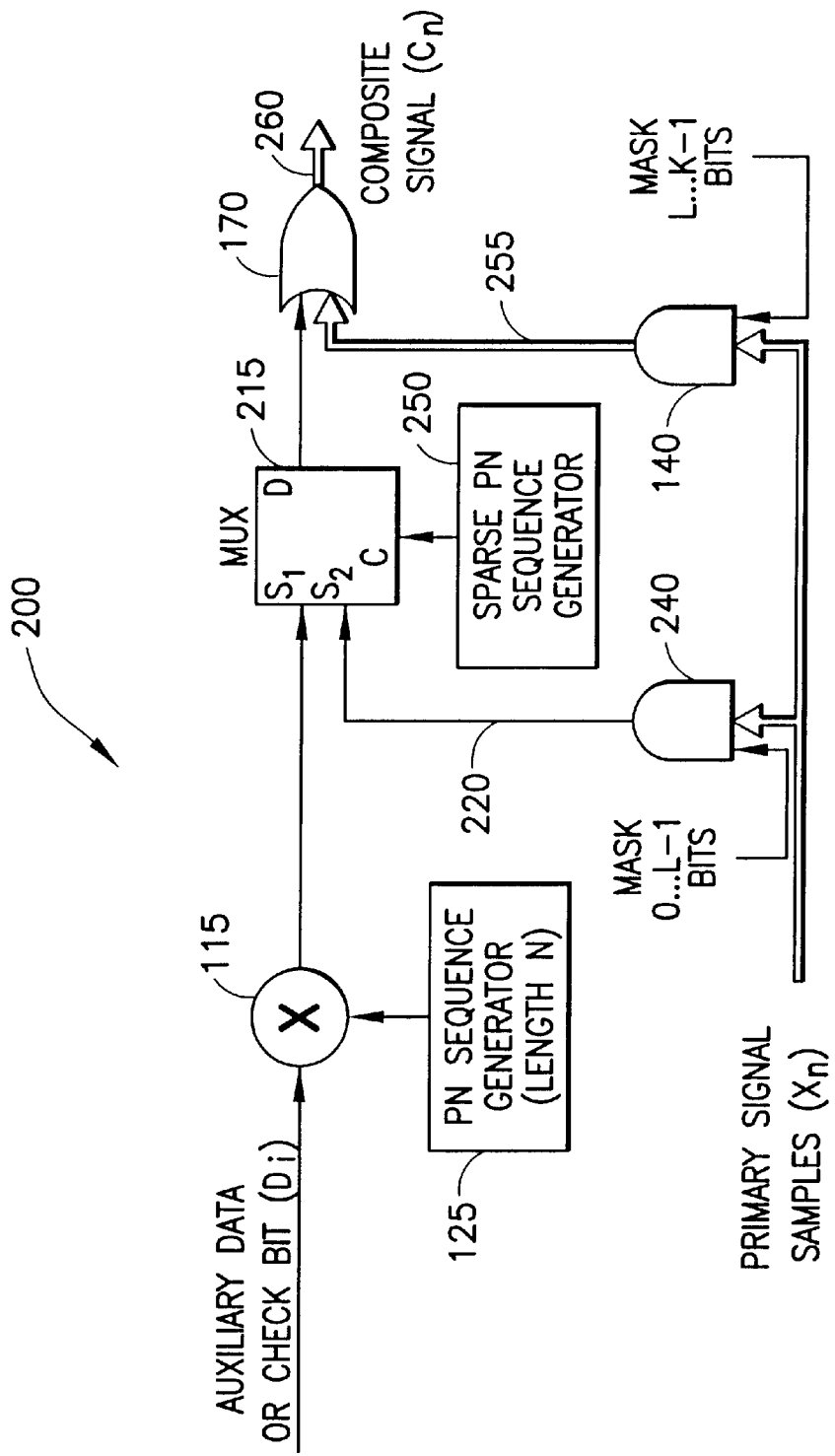
FIG. 2 illustrates a sparse PN DHDT encoder in accordance with the present invention.

FIG. 2 illustrates a sparse PN DHDT encoder 200 in accordance with the present invention. Like numbered elements in the figures correspond to one another.

In the encoder 100 of FIG. 1, the LPSBs (e.g., $0_0$ and $1_1$ with L=2) were lost (e.g., modified) in each sample during the encoding process. Consequently, the encoder 100 introduced some noise to the primary signal. In many cases, e.g., such as for hi-fidelity master audio recordings, it is desirable not to destroy all of the original LPSBs. The idea behind "Sparse PN", disclosed in FIG. 2, is to modify only a fraction of the primary signal's LPSBs. This has the effect of lowering the noise introduced in the encoder.

The LPSBs to be modified are determined by the sparse PN sequence, which can be random. For example, only the first, third, sixth, seventh, tenth, and so on LPSBs may be replaced by the modulated auxiliary data or CRC check bits. The sparseness is defined as the portion of LPSBs that are not replaced. For example, if 80% of the LPSBs are not replaced, the sparseness is 0.8.

The successive frames of K sample bits from the primary data signal are provided to AND functions 140 and 240. At the AND function 140, the sample bits are ANDed with a mask bit pattern to preserve bits L through K−1 in each sample. At the AND function 240, the sample bits are ANDed with a mask bit pattern to extract the LPSBs. The LPSBs are provided via a line 220 to a conventional multiplexer (MUX) 215. The MUX 215 provides an output bit D corresponding to the bit received at either of the inputs S1 or S2 based on a control signal C. The control signal C is provided by a sparse PN sequence generator 250. A 0 or 1 bit in the sparse PN sequence selects either the input $S_1$ or $S_2$.

Generally, the length of the sparse PN sequence should be greater than N.

At the AND function 140, the sample bits for each sample are ANDed with a mask bit pattern to preserve sample bits L through K−1 as discussed in connection with FIG. 1. The preserved sample bits are provided via a line 255 to an OR function 170. The OR function 170 combines the preserved sample bits provided via line 255 with the output of the MUX 215 to provide the composite signal.

For example, with L=2, K=10, and sample bits 1001001110, the mask bit pattern provided to the AND function 240 is 0000000011, and the output on line 220 is 0000000010. Additionally, the mask bit pattern provided to the AND function 140 is 1111111100, and the output on line 255 is 1001001100.

The sparseness of the sparse PN sequence generator 250, or the fraction of the LPSBs that are not modified, has a direct bearing on the bit error rate (BER) of the auxiliary data. Specifically, the BER increases as the sparseness increases. At the boundary case, with a sparseness of 0.0, the LPSBs in each successive sample are replaced by the auxiliary data sequence, and the BER is zero if the composite signal is transmitted through a clear channel. At a sparseness of 1.0, none of the samples have their LPSBs replaced, and no meaningful data is transmitted.

Hence, system design should take any bit error rate requirement into consideration. A sparseness of <0.5 guarantees error-free transmission of the auxiliary data in a clear channel. That is, more than half of the LPSBs (the bits that the decoder uses for decoding) are candidates for modification. However, in a noisy channel, the sparseness can be adjusted to above or below 0.5 to meet the BER requirements.

There are special cases where error-free transmission of data is required, especially in cases where there is a clear channel. The sparse PN method can be modified so that the encoder of FIG. 2 can guarantee that the auxiliary data has been embedded into the composite signal without errors. Specifically, using known data communication techniques, decoder circuitry, such as disclosed in FIGS. 5, 7, 9 and 11, can be provided at the encoder (e.g., coupled to line 260) so that the encoder decodes the composite signal prior to transmission, storage or other use, to test if the auxiliary data can be decoded correctly. If so, the encoding process is complete.

However, if the encoder's decoding circuitry does not correctly decode the auxiliary data and CRC check bits from the composite signal, the sparseness can be decreased slightly at the sparse PN sequence generator 250, and the encoding process is repeated to yield a new composite signal. This process is iterated until the auxiliary data is decoded correctly from the composite signal. At this point, the composite signal is suitable for transmission, storage or other use.

Another advantage of the sparse PN technique of the present invention is that it provides additional security to prevent an attacker from intercepting the auxiliary data embedded in the primary data signal. This is true since, if the decoder does not know which of the samples are selected for modification, then the decoder cannot restore the composite signal to the primary signal.

In some cases, it is desirable for the decoded composite signal to be different from the original primary signal so that any tampering by an attacker can be detected by comparing the decoded composite signal with the original primary signal.

An example implementation of the sparse PN sequence generator 250 in accordance with the present invention is as follows. A random number generator with an output range of 0 to 1.0 can be used as a sparseness knob (e.g., adjustment) by setting a threshold value. Each random number is paired with one of the LPSBs. For example, a threshold of 0.9 corresponds to a sparseness of 0.9, assuming a uniform Probability Density Function (PDF). That is, only the samples corresponding to a random number with a value of 0.9 to 1.0 are allowed to be modified such that the modulated auxiliary data or CRC check bit chips correlate more with the sparse data PN sequence.

Figure 3:
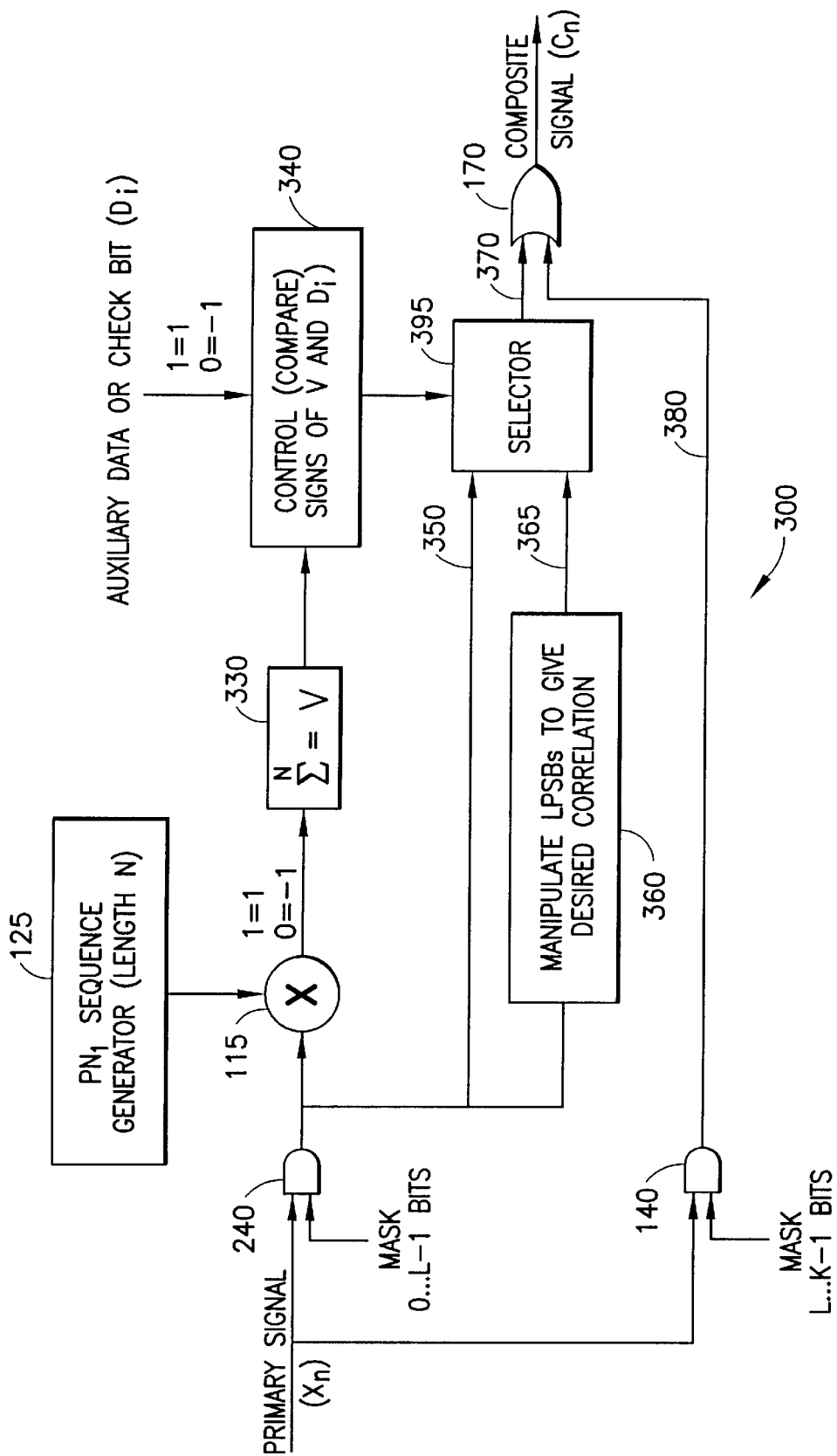
FIG. 3 illustrates a general DHDT encoder implementing a Cross-Term Compensation (CTC) algorithm in accordance with the present invention.

FIG. 3 illustrates a general DHDT encoder 300 implementing a Cross-Term Compensation (CTC) algorithm in accordance with the present invention.

For practical applications, it is desirable to change the minimum number of primary signal sample bits to achieve minimal degradation of the primary signal.

Sometimes, embedding the auxiliary data and CRC check bits into the LPSBs may introduce a perceptible amount of noise into the composite signal. This perceptible noise is caused by perturbation of the primary signal at the encoder when the auxiliary data is embedded, which essentially adds noise to the primary signal. If the encoder only adds the minimum amount of noise needed to transmit an auxiliary data or CRC check bit, it may be possible to make the composite signal perceptually no different from the primary signal. For example, for a composite audio or video signal, the typical user cannot hear or see any difference due to the auxiliary data.

Cross-Term Compensation (CTC) extends the concept of sparse PN (sparsely modifying the LPSBs to minimize noise power), discussed in connection with FIG. 2. Specifically, with CTC, the minimum amount of signal energy is calculated that needs to be added to the primary signal so that the decoder decodes the auxiliary data and CRC check bits correctly all the time. Hence, the technique of CTC can guarantee error-free transmission of the auxiliary data through a clear channel (for example, if the composite signal resides on a medium such as DVD or CD) with minimal modifications to the primary signal. In some instances of CTC encoding, the primary data stream does not need to be perturbed at all when transmitting auxiliary data since its LPSBs already provide the desired correlation.

Since the decoder has no knowledge of which LPSBs were originally perturbed, CTC inherits the security properties of sparse PN.

The CTC technique discussed in commonly-assigned, pending U.S. patent application Ser. No. 08/805,732, filed Feb. 25, 1997, entitled "Cross-term Compensation Power Adjustment of Embedded Auxiliary Data in a Primary Data Signal," incorporated herein by reference, may be adapted for use with the present invention.

The minimum amount of signal energy to guarantee proper decoding of the auxiliary data and CRC check bits can be determined as follows. Consider the case of transmitting a single auxiliary digital data bit. The encoder modulates a PN sequence over N samples. Assuming the PN sequence of the decoder is properly aligned with the PN sequence of the encoder, the decoder can demodulate meaningful data. This demodulation process involves an accumulation of N samples along with some decision logic. Assume further, with L=1 LPSB, that the possible range for the accumulated values are from −N to +N (where N again is the length of the modulating PN sequence) and the decoder has its decision boundary located at 0. This assumes the auxiliary data bits with binary values of 0 and 1 are assigned to values −1 and 1, respectively, for the CTC calculations. If the binary values of 0 and 1 are used for CTC, then the possible range for the accumulated values are from 0 to +2N. Other variations will become apparent to those skilled in the art.

Then, assuming values of −1 and +1 are used, an accumulated value that is negative can represent that a binary 0 was transmitted as the auxiliary data bit, while a positive value can represent that a binary 1 was transmitted as the auxiliary data or check bit. Cross-term compensation makes use of this fact to manipulate the minimum number of LPSBs.

The DHDT encoder 300 of FIG. 3 uses CTC. The primary data signal, $X_n$, which comprises successive K-bit samples, is provided to an AND function 240 to obtain the LPSBs. The subscript "n" designates the sample number, e.g., n=1, 2, . . . Each bit of $X_n$ is processed successively by the encoder 300. An appropriate mask bit pattern is provided to the AND function 240 to obtain the LPSBs in each sample. At the encoder side, the cross-correlation value between a random sequence $PN_1$ from a random sequence generator 125 and the LPSBs of the primary signal is measured. The output of a multiplier 115 is accumulated at an accumulator 330 to obtain a cross-correlation term V. At a control/decision block 340, a determination is made as to whether V, the accumulated value over N LPSBs corresponds (e.g., has the same sign or polarity) as the ith auxiliary data or CRC check bit, $D_i$, i.e., i=1, 2, . . . If so, the encoder does not need to manipulate the LPSBs to embed the auxiliary data, and the composite signal will be the same as the primary signal. In this case, the control issues a command to a select function (e.g., multiplexer) 395 to "pass through" the sample bits unchanged on line 350 to line 370, to be combined with the preserved MSBs on line 380 to form the composite signal.

However, if the control 340 detects that the signs of V and $D_i$ do not have the desired correspondence (or, more specifically, (a) $D_i$ is greater than the midpoint of the possible range of V, and V is less than the midpoint, or (b) $D_i$ is less than the midpoint, and V is greater than the midpoint), then the control 340 commands a function 360 to toggle ($|V|/2$)+1 of the LPSBs to produce the desired correspondence. For example, with V=4, three bits are toggled. "Toggle" here means to flip an LPSB from 0 to 1, or from 1 to 0. Once the LPSBs are manipulated at block 360, they are provided to the selector function 395 via path 365 to line 370, to be combined with the preserved MSBs on line 380 to form the composite signal.

Processing then continues for the next sample of the primary signal.

In each sample, the bits that are eligible to be toggled at the block 360 can be checked first, prior to toggling, to see if toggling helps produce the desired correlation. The following discusses how one or more bits (e.g., LPSBs) can be helpful in producing the correct correlation. The encoder should toggle enough LPSBs to enable the decoder to decode the correct auxiliary data bit from the received composite signal. The choice of LPSBs can be random (e.g., pseudo-random), or can be chosen to further minimize perceptible (e.g., audible or visible) artifacts in the primary data signal according to the specific sparse PN sequence chosen.

The advantage of CTC is that a direct computation of the LPSBs to be manipulated is possible without the iterative approach of sparse PN alone.

Figure 4:
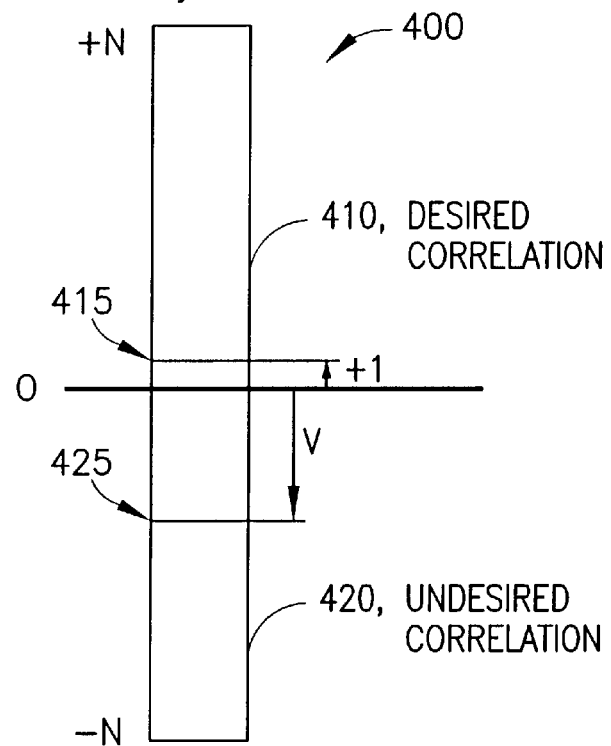
FIG. 4 illustrates an example CTC value in accordance with the present invention.

FIG. 4 illustrates an example CTC value, V, in accordance with the present invention for determining the LPSBs that help produce the desired correlation. An example correlation obtained from correlating the modulated auxiliary data bit with the LPSBs of the primary signal is illustrated. The correlation value 400, denoted as V, may range from −N to +N. A desired correlation value 410, which is positive, such as a +1 value 415, implies that the decoder will properly decode the intended auxiliary data bit. Conversely, an undesired correlation value 420, which is negative, such as the example value V 425, implies that the decoder will not decode the transmitted auxiliary data or check bit without some modifications to the LPSBs (e.g., at function 360 in FIG. 3).

Often, a set of LPSBs will naturally have the desired correlation to decode the transmitted auxiliary data bit. However, other times, the LPSBs will not have the desired correlation. For illustration, in the example below, the correlation value V is assumed to be negative for the current sample. Thus, it currently has a correlation that will not decode to the intended auxiliary data. With the CTC technique of the present invention, the encoder 300 (e.g., block 360) searches for "helpful" LPSBs that can be toggled to produce the desired positive correlation.

To determine if an LPSB will help produce the desired correlation, the encoder 300 can simply toggle the LPSBs, re-calculate the correlation, and determine if the correlation is greater than the old one.

Another approach is to do the comparison on a sample-by-sample basis, by first multiplying the jth bit of the PN sequence from generator 125 (j=1 to N) with the auxiliary data bit, $D_i$. This product, Z, is what the transmitted LPSB should be for the desired correlation. If the ith LPSB is not equal to Z, then the ith LPSB can be flipped to move the correlation value V in the positive direction, i.e., towards the desired correlation.

To illustrate with a simplified example, assume the LPSBs of successive samples are 1011, the $PN_1$ sequence is 0101, and the $D_i$ is 1, with a value of +1. Then the output of the multiplier 115 is 0, 0, 0 and 1, with values of −1, −1, −1, and +1, respectively, and V=−2. The control 340 determines that −2 and +1 have different signs, indicating an undesired correlation, and instructs the function 360' to flip, e.g., two of the first three LSBs, to yield LPSBs of 0111. The output of the multiplier 115 now is 1101, V=+2, the control 340 determines that +2 and +1 have the same signs, and the new first two LPSBs (01) are provided via line 365 to replace the original first LPSBs (10) in the corresponding samples, on line 370.

If the above example was changed such that $D_i$=0, with a value −1, then the control 340 would determine that −2 and −1 have the same signs, indicating a desired correlation, and instruct the selector 395 to pass the samples with the LPSBs 1011 through to the composite signal via line 350.

As discussed previously, the zero level of FIG. 4 is more generally the midpoint of the possible range of V.

Figure 5:
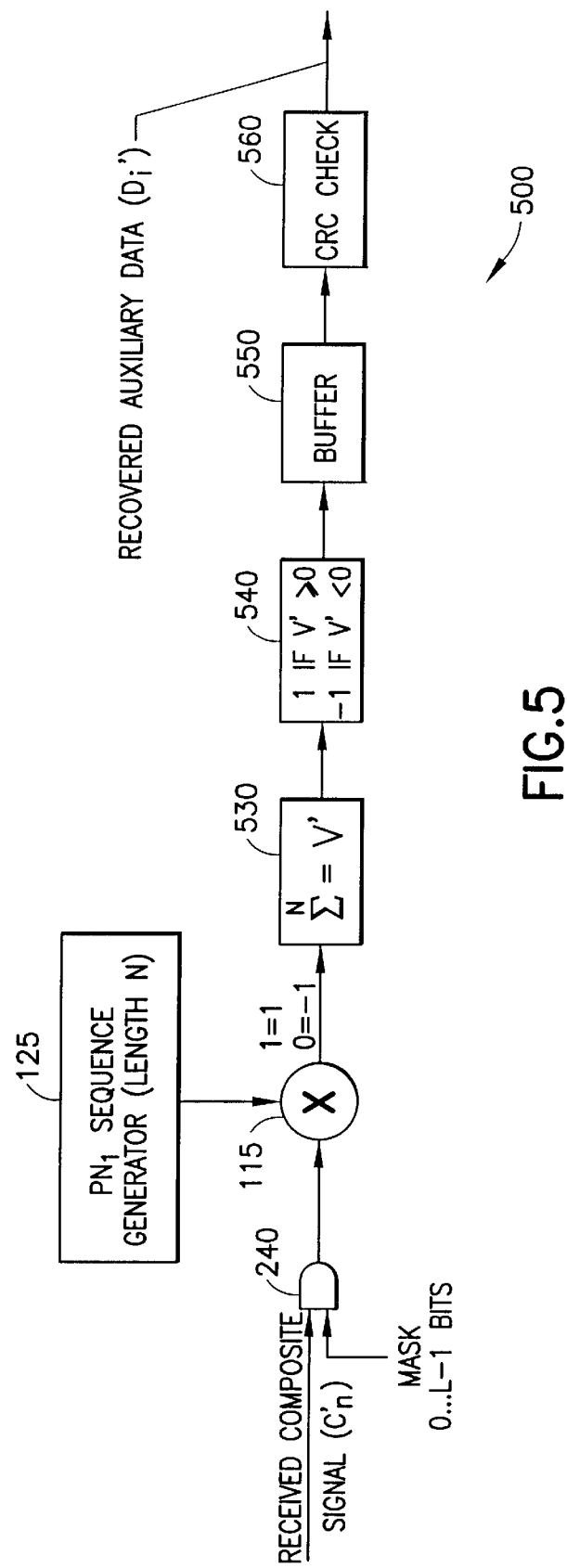
FIG. 5 illustrates a general DHDT decoder in accordance with the present invention.

FIG. 5 illustrates a general DHDT decoder 500 in accordance with the present invention. The composite signal ($C_n$) provided, e.g., by the encoders of FIGS. 1–3, may be received (e.g., as $C_n'$) at the decoder 500 via a broadcast signal, from a storage media, via a computer network, or the like. To decode the auxiliary data and check bits, first the LPSBs of the samples are extracted at an AND function 240 by appropriately masking each successive sample of the composite signal.

Next, the LPSBs are multiplied with the PN sequence $PN_1$ provided from a sequence generator 125, which corresponds to the PN sequence generator used by the encoders in FIGS. 1–3.

The correlation value is then accumulated at an accumulator 530 to provide the value V', which is provided to a decision device 540 to determine the auxiliary data bit. The auxiliary data or check bit is determined to be 1 if V'≧0, or −1 if V'<0, where zero is the threshold decision value in this example. Again, a midpoint value of V other than zero may be used. The decoded auxiliary data or check bit is then buffered at a buffer 550, which may be a CRC buffer when CRC check bits are used, and processed by a CRC check function 560, discussed further in connection with FIG. 11. Each bit is processed successively by the components that are prior to the buffer 550, then stored in the buffer to obtain a frame of bits such as the frame 600 of FIG. 6. comprising. The decoding process is repeated until there are enough auxiliary data bits to form the vector (e.g., frame) of recovered auxiliary data and check bits, D'.

The decoder must be synchronized with the encoder to correctly recover D'. Specifically, the spreading sequences of the encoder and decoder must be time-aligned. The decoder checks to see if it is time-aligned with the encoded auxiliary data by hypothesis testing.

To maintain synchronization, as discussed, a CRC code is appended to the auxiliary data. Note that while CRC codes are discussed in the present example, any check bit or sync pattern scheme may be used.

The decoder is properly synchronized when the received block of data plus the received CRC bits match up with the computed CRC value. If the decoder and the encoder timing is off by one or more samples, the decoded data will be random and the received and computed CRC values will not match.

Advantageously, the decoder need not know which samples are modified when sparse PN is used. This is a security feature since the sparse PN sequence used at the encoder can be discarded. When a sample having no embedded data is decoded by having it demodulate a PN sequence at a decoder, the accompanying check bit data will indicate that embedded data is not present.

Nor, in any embodiment, does the decoder need to know which LPSBs are modified when using the sparse PN or non-sparse PN schemes.

FIG. 6 illustrates the structure of the auxiliary data frame, D, before being added to the primary signal in accordance with the present invention. At an encoder, CRC check bits 620 are appended to the auxiliary data bits 610 to form the data frame D for synchronization purposes at the decoder. The notation $D_i$ refers to the ith bit of D.

The self-synchronous feature of Digital HDT is performed by checking the CRC of the data recovered with the embedded CRC. It is assumed that the decoder knows the length of the frame D. If the calculated CRC does not match the CRC that was embedded into the data, then a new hypothesis is tested, as discussed below.

FIG. 7 illustrates a self-synchronization module 700 in accordance with the present invention.

The block diagram of FIG. 7 illustrates hypothesis testing to determine if the decoder is synchronized with the encoder. First, the CRC bits of the received auxiliary data portion of D' are computed at a CRC function 710. The computed CRC bits are then checked with the appended CRC bits of $D_n'$ at a decision block 730 to determine whether the two values are the same. If so, the decoder is properly synchronized with the encoder, as shown at block 750, and the auxiliary data 610 is valid. A sync flag is set accordingly, as discussed further in connection with FIG. 9. Otherwise, as shown at block 740, the decoder is not synchronized and the auxiliary data 610 is not valid. The sync flag is set accordingly, and hypothesis testing should therefore continue.

An alternative method for validating the data block is to compute the CRC of the entire block of auxiliary data and CRC check bits and verify that a result of zero is obtained. A result of zero indicates that the decoder is synchronized.

Figure 8:
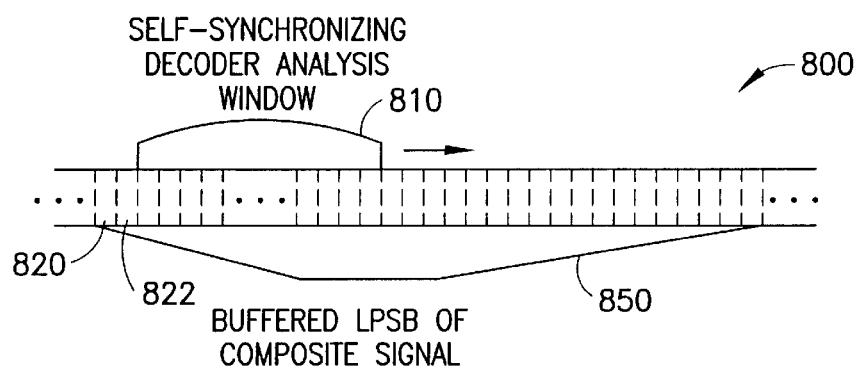
FIG. 8 illustrates a hypothesis search at a decoder in accordance with the present invention.

FIG. 8 illustrates a hypothesis search at a decoder in accordance with the present invention. The hypothesis search can be thought of as a sliding analysis window 810 over the buffered LPSBs 850, which are recovered over a number of samples of the received composite signal. Each bit is represented as being stored in a cell, e.g., 820, 822, . . . in a buffer 800. Each offset of the analysis window 810 is a possible candidate for hypothesis testing. Here, the window extends over N bits, which is the number of chips in the PN sequence to produce one auxiliary data or check bit.

For each position of the sliding analysis window 810, the computed CRC bits are compared to the appended CRC bits to determine if there is a match. The window 810 may be shifted by one bit, e.g., to the right, for each comparison until a match is found.

Figure 9:
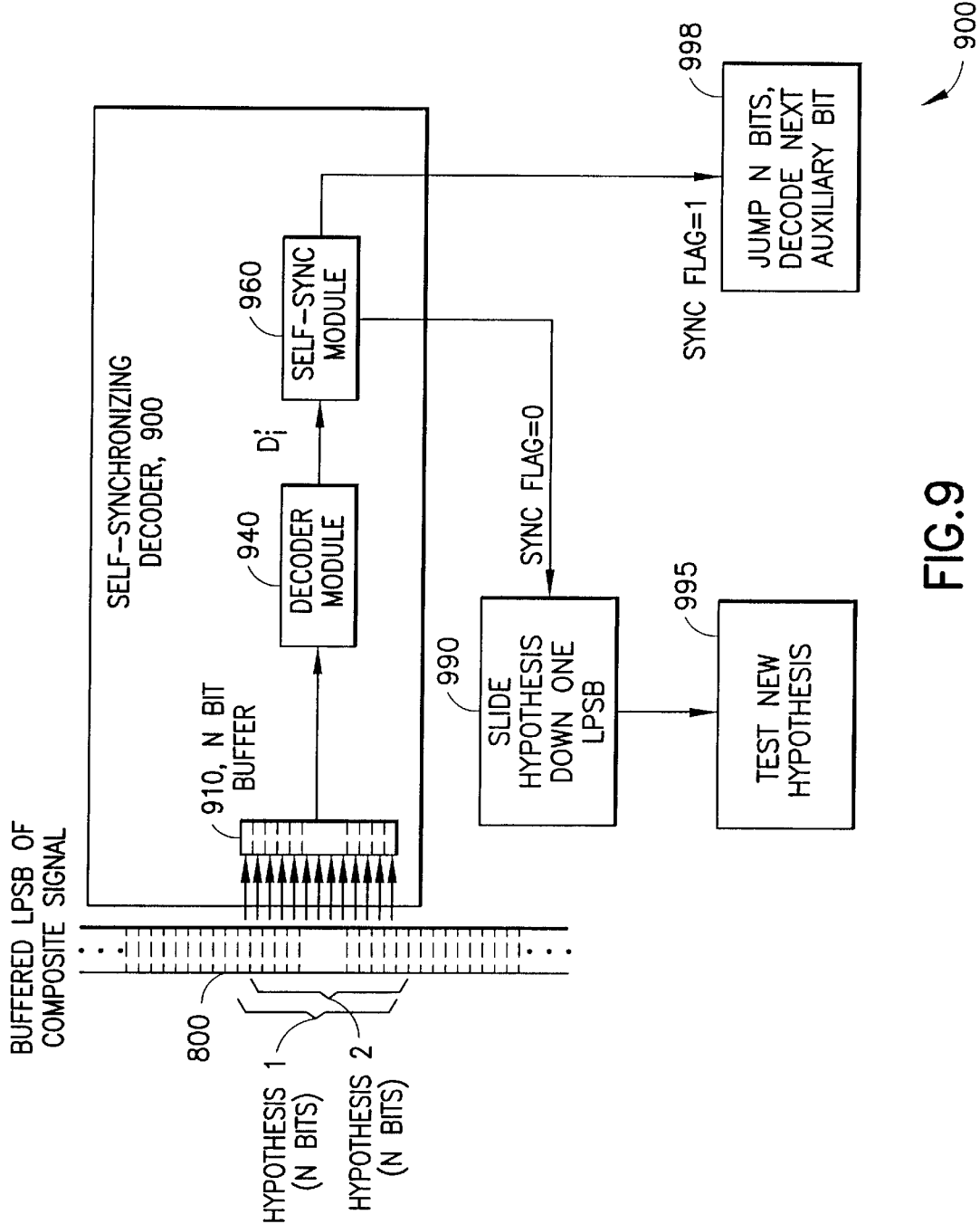
FIG. 9 illustrates in detail a hypothesis search at a decoder in accordance with the present invention.

FIG. 9 illustrates hypothesis search/testing in detail at a decoder in accordance with the present invention. The self-synchronous decoder 900 performs hypothesis testing on successive possible offsets until a match is found. If a hypothesis test fails (e.g., the computed and received CRC bits do not match), the decoder goes to the next possible offset.

To check a given hypothesis, the self-synchronizing decoder 900 buffers N bits of LPSBs from the current analysis window in a buffer 910, where N is the size of the analysis window 810. Hypothesis 1 is buffered in the buffer 910 from the larger buffer 800 containing the LPSBs. The decoder module 940 represents the decoder 500 shown in FIG. 5 from prior to the multiplier 115 up to and including the buffer 550. The decoder module 940 produces the recovered auxiliary and check bit data frame, D', which is provided to a self-sync module 960 to determine if the decoder is synchronized.

If the decoder is not synchronized, sync flag=0, and a module 990 determines the next analysis window of data to use, e.g., by sliding the window down by one bit. A new hypothesis is tested as shown at a module 995 by sliding the analysis window by one bit. For example, if the self-synchronizing decoder 900 does not synchronize to Hypothesis 1, then it will check Hypothesis 2 next.

If the decoder is synchronized, the sync flag=1, and the decoder skips ahead one analysis window (N-bits) to decode the auxiliary data there, as shown at function 998.

Figure 10:
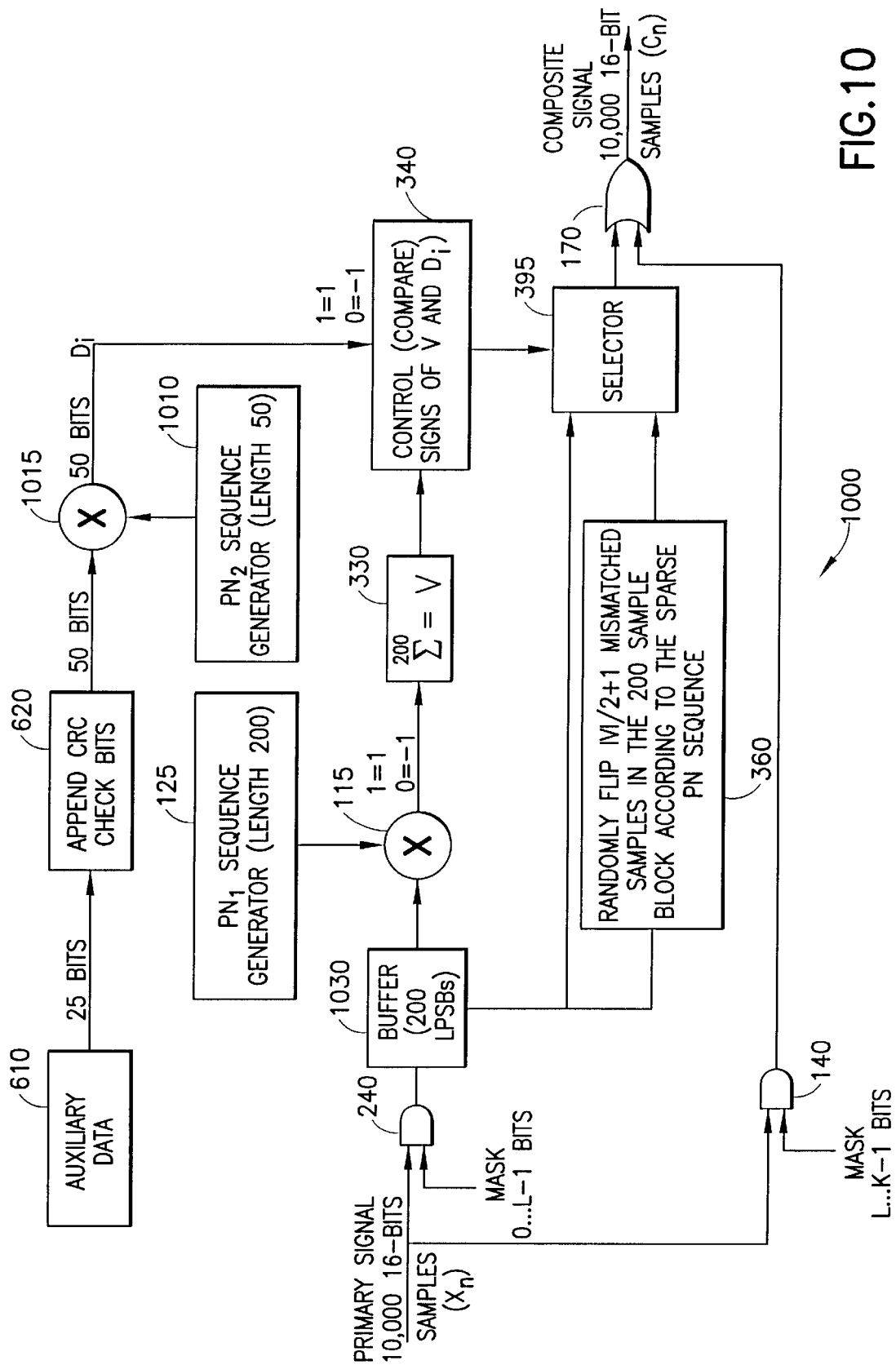
FIG. 10 illustrates a DHDT encoder with scrambling in accordance with the present invention.

FIG. 10 illustrates a DHDT encoder with scrambling in accordance with the present invention. A specific example implementation is shown which is useful, e.g., for embedding scrambling keys in a primary signal, such as an audio signal. It should be appreciated that the present invention can be adapted to a variety of embedded signaling systems (including video and others) and is not restricted to audio applications.

An encoder 1000 uses two pseudo-random sequences as modulated sequences. A sequence $PN_1$ from a sequence generator 125, with an example length of 200 chips, is modulated by the LPSBs of 16-bit samples. A sequence $PN_2$ from a sequence generator 1010 is an additional pseudo-random sequence that scrambles the auxiliary data $D_i$ at a modulator/scrambler 1015. The scrambling is an additional layer of security for this implementation of the DHDT system. With this scheme, an attacker faces the difficult task of performing an exhaustive search to uncover the modulating sequence, where the number of searches required is the product of the number of possible values of $PN_1$ and the number of possible values of $PN_2$. For example, for a $PN_1$ length of 200 chips, and a $PN_2$ length of 50 chips, the number of searches required is $2^{200} \times 2^{50}$ ($=10^{75}$)

FIG. 10 shows a DHDT encoder operating on 16-bit audio samples. A hypothetical design could specify that 25 auxiliary data bits be encoded over 10,000 16-bit audio samples. Assuming the ratio of auxiliary data bits to check bits is 1:1, although this is only an example, there are 25 check bits, for a total of 50 auxiliary data and check bits. As shown at block 1030, the 10,000 16-bit audio samples can be formed into 50 frames, each with 200 LPSBs.

Since this example employs CTC, only the minimum number of LPSBs need to be modified to produce the correct correlation. This example only uses the least significant bit (bit position 0, or L=1) of each sample for hiding auxiliary data.

The LPSBs are correlated with the $PN_1$ sequence by multiplying the LPSBs and the $PN_1$ sequence at a multiplier 115, and the result is accumulated at an accumulator 330. The cross-correlation value, V, is then compared against the auxiliary data or check bit at a control/decision function 340. The auxiliary data or check bit is assigned the binary value 1 if it is a 1, or −1 if it is a 0.

If the correlated value, V, has the same sign as the auxiliary data or check bit, then the LPSBs in their current state will produce the desired correlation, and the control 340 commands the selector 395 to pass-through the LPSBs unchanged. That is, the LPSB does not need to be modified to carry the auxiliary data or check bit since the decoder will correctly decode the transmitted auxiliary data or check bit.

However, if V happens to be of the opposite sign as the auxiliary data or check bit, the control 340 commands a function 360 to manipulate a certain number of bits in the samples to produce the desired correlation.

It is useful for the encoder only to flip LPSBs that will help produce the desired correlation. These LPSBs are termed "helpful" LPSBs, discussed previously. It can be shown that by flipping one "helpful" LPSB, the correlation value V will move towards the desired correlation by 2. Therefore, to obtain a correlation value of 0, the encoder needs to flip $|V|/2$ bits. However, a correlation value of 0 does not correspond to any transmitted auxiliary bit since the threshold detector is at a correlation value of 0. Therefore it is desirable to flip $|V|/2+1$ bits at function 360 when V does not have the same sign as the auxiliary data or check bit as determined at the control 340.

When more than one bit can be flipped to achieve the desired correlation, it is possible to flip each of these bits. Or, a random (e.g., sparse PN sequence) or other selection process can be used to select among the potential bits to flip.

In FIG. 10, processing occurs for each auxiliary data and CRC check bit.

In the above DHDT encoder example, the auxiliary data was embedded over a window size of 10,000 samples. The corresponding decoder needs to demodulate 10,000 samples to obtain the 50 bits (25 bits of auxiliary data+25 bits of CRC check). Once these 50 bits are obtained, the decoder can check to see if it is synchronized with the encoder. The decoder may require up to 2×10,000−1 samples of LPSBs to synchronize, since a window size of 10,000 samples is guaranteed to be found within 2×10,000−1 samples. Therefore, it is necessary to buffer 2×10,000=20,000 samples for the worst case scenario.

Figure 11:
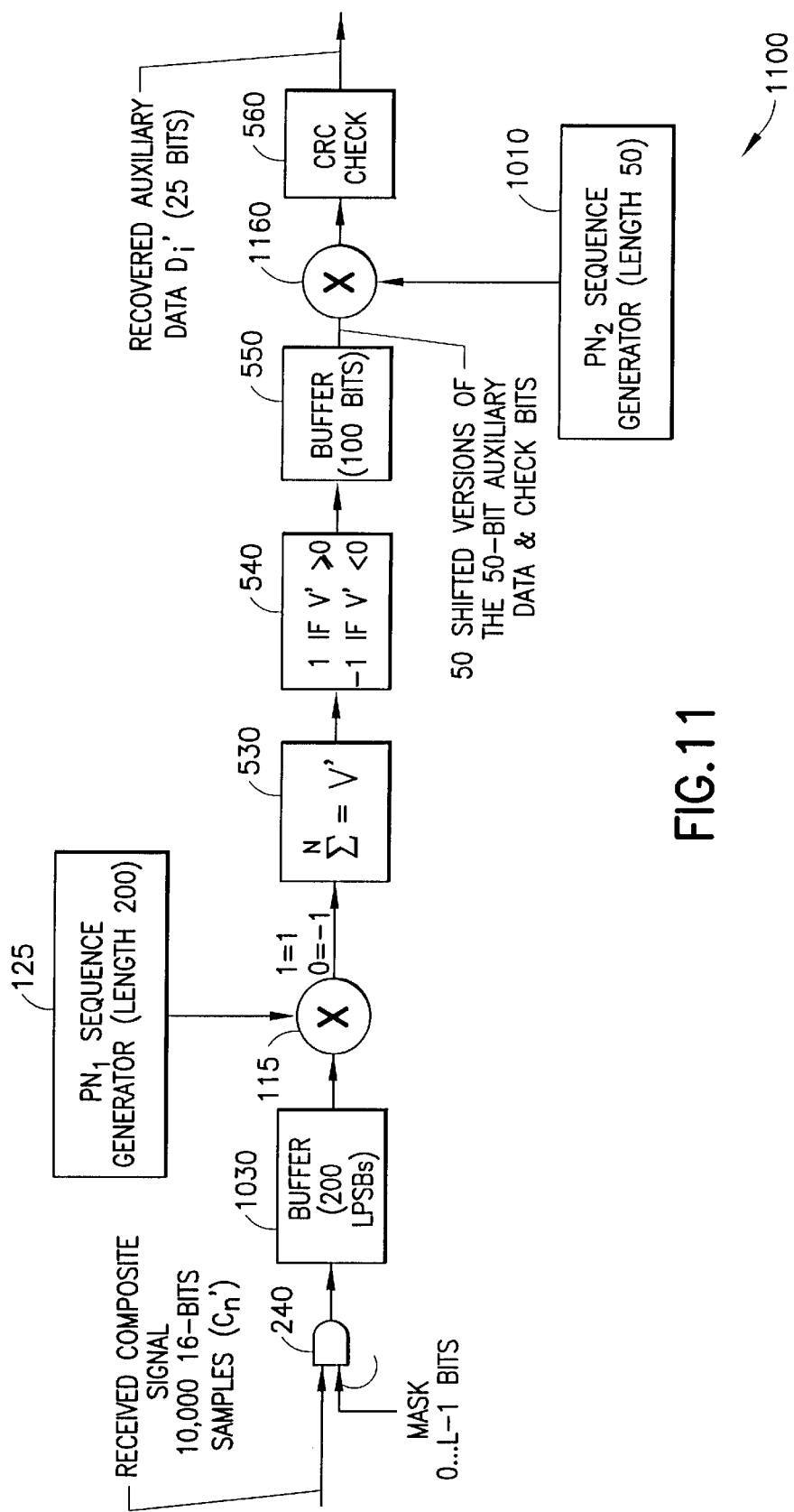
FIG. 11 illustrates a self-synchronous DHDT decoder for use with the encoder of FIG. 10 in accordance with the present invention.

FIG. 11 illustrates a self-synchronous DHDT decoder in accordance with the present invention. The decoder may be used with the encoder of FIG. 10, for example. Each bit is processed successively by the components that are prior to the buffer 550.

The self-synchronous decoder 1100 performs the following steps for synchronization:

1. 2×10,000 samples of LPSBs are buffered;
2. Decorrelate (by multiply and accumulate) 200 samples at a time, threshold detect to produce 1 bit at decision block 540, and shift the bit into the buffer 550;
3. Repeat step 2 fifty times to fill the CRC buffer;
4. Descramble with the sequence $PN_2$ from the generator 1010 at the descrambler 1160, and check the CRC result for each of the 50 shifted versions of the 50-bit auxiliary and check data for a CRC match at CRC check function 560;
5. If no match is found, shift 1 bit into the LPSB buffer 1030 and go to step 2;
6. Repeat step 5 until a match is found; and
7. Record the timing reference so that hypothesis testing is no longer required. The timing reference indicates a bit shift distance relative to the start of the group of LPSBs that are decorrelated at one time. For example, with a group of 200 LPSBs decorrelated at one time, the timing reference may be a value between 0 and 199.
8. After one timing reference has been determined for a first group of LPSBs, appropriate components can be provided, e.g., at the check function 560, for storing and retrieving the timing reference for the next successive group of LPSBs when performing steps 4–7 above to speed the synchronization process.

The decoder 1100 performs the above steps.

Figure 12:
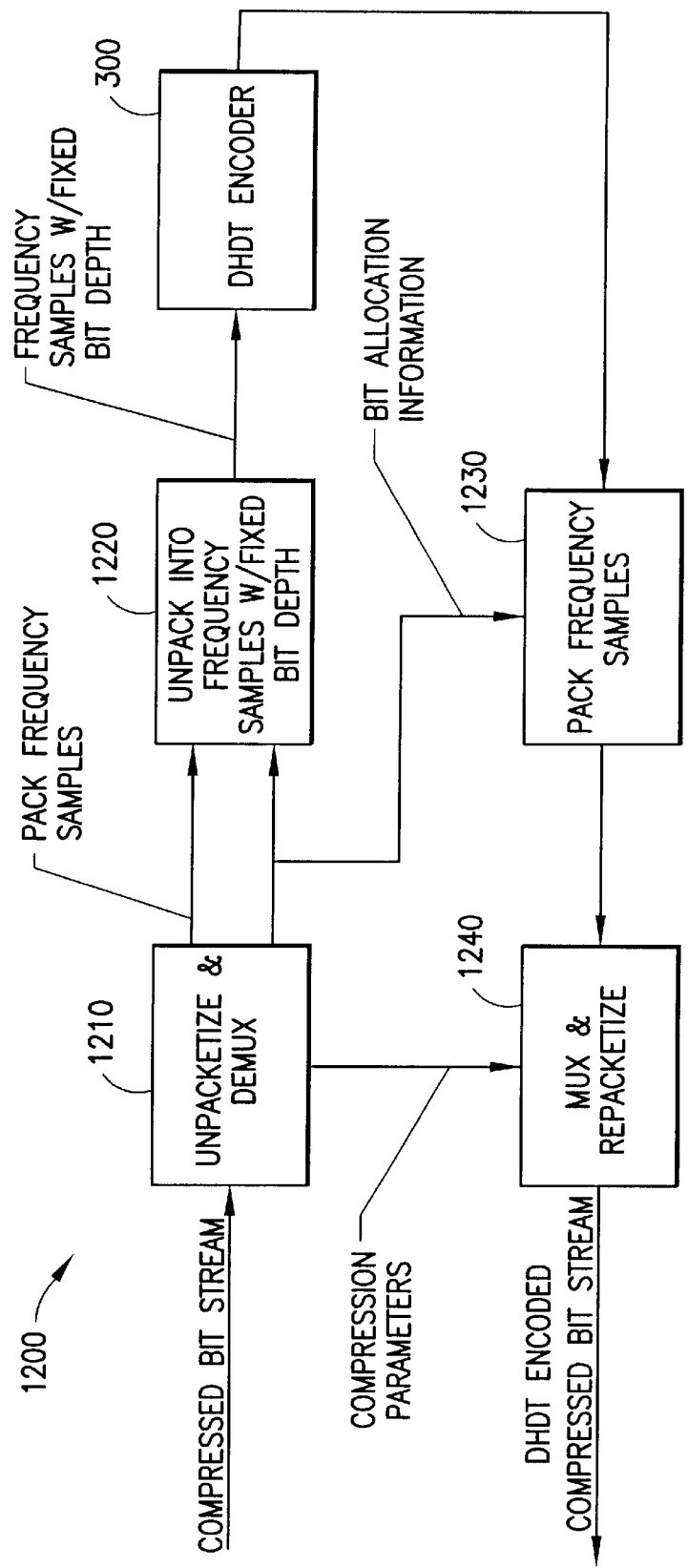
FIG. 12 illustrates a DHDT encoder for compressed data in accordance with the present invention.

FIG. 12 illustrates a DHDT encoder for compressed data in accordance with the present invention. The encoder 1200 includes an unpacketize and demultiplexing function 1210 for obtaining compression parameters, packed frequency samples, and bit allocation information from a compressed bit stream. The packed frequency samples are provided to an unpack function 1220 where they are unpacked into frequency samples with a fixed bit depth. The frequency samples with a fixed bit depth are provided to a DHDT encoder as described previously, such as the encoder 300 of FIG. 3. The encoders 100 and 200 of FIGS. 1 and 2, respectively, may also be used.

The encoded data, comprising unpacked frequency samples, is provided from the DHDT encoder 300 to a pack function 1230 for packing. The packed frequency samples are multiplexed and repacketized at a function 1240 to provide a DHDT encoded compressed bit stream with the auxiliary data embedded therein.

Generally, the same principles that DHDT applies to Pulse Coded Modulated (PCM) samples can be applied to compressed domain schemes. In the compressed domain, the primary data signal is usually represented by its frequency domain samples, in the form of transform coefficients (such as spatial transform coefficients) or subband coefficients. LPSBs of these frequency samples can be manipulated in accordance with the case for PCM time samples. Assuming the compression system has performed an optimum bit allocation to quantize the frequency samples, each LSB would contain nearly equal amount of perceptually significant information. Therefore, the distortion introduced by the DHDT process naturally follows the perceptual masking effect.

Most of the prevailing compression systems, for audio or video or images, tend to use frequency domain techniques to reduce the perceptually redundant information from the signal being compressed. Therefore, majority of the compressed bit streams can be parsed and decoded into a set of parameters that include a set of frequency samples or transform coefficients. Examples are subband samples in MPEG audio coding, TDAC transform coefficients in AC-3 or AAC audio coding, and DCT coefficients in JPEG and MPEG image and video coding. These representations can be generalized as "frequency samples".

Other types of compression which may be accommodated with the present invention include companding (e.g., mu-law, A-law), floating point representation, differential PCM, predictive coding cases, and vector quantization.

In a generalized compression scheme, a group of uncompressed signal samples are represented by a group of frequency samples, which are quantized according to the perceptual criteria for efficient storage and transmission. The ratio between the number of frequency samples required to represent the number of signal samples are usually fixed, e.g., at one. However, the number of frequency samples actually selected for transmission may be less, since some of the perceptually unimportant frequency samples are often not transmitted. This can be easily determined by extracting the bit allocation information contained in the compressed bit stream. The frequency samples that are not transmitted usually have zero bits allocated, or otherwise indicated as zeros (e.g., a run length is indicated for a series of zeros). In essence, from the compressed bit stream, a binary representation of the frequency samples can be extracted with an augmentation information that indicates the number of bits allocated, dynamic range of the frequency sample, or the scale factor needed to restore the frequency sample to it full value.

Once the binary representation of the frequency samples are extracted, then the process of embedding the Digital Hidden Data Transport signal is no different than the process that applies to the uncompressed domain signal samples, e.g., time domain PCM representation. One practical difference is that, for some frequency samples, there are not enough bits allocated to allow for LPSB bits. If, for example, zero bits were allocated for a frequency sample, there is no LPSB bit that can be flipped and that frequency sample is skipped. In a well designed compression scheme, all least significant bits in the frequency samples are nearly equally important, in the perceptual sense. In addition, extra spectral shaping may not be necessary since the bit allocation and quantization provided by the compression should have incorporated the perceptual spectral shaping. In general, however, all techniques applicable to uncompressed domain DHDT should be applicable to the compressed domain DHDT.

After DHDT embedding, the modified frequency samples must be re-packaged to conform to the original bit stream format. In most cases, this should not require re-quantization, just re-packetization. This process will be specific to the compression technique used. Some compression schemes may require variable length encoding, such as Huffman code, and specific measures must be taken if the size of the compressed bit stream must remain unchanged. Most compression schemes inherently produce a variable length bit stream, and the subsequent transport stream format usually accommodates the change in size of the bit stream.

One side benefit of applying DHDT in the compressed bit stream may be a slightly easier self-synchronization at the decoder. This is true since the frame structure or the packet structure present in the compressed bit stream format can make it easier for the decoder to determine the frame boundary used in DHDT encoding.

Various alternatives and enhancements to the present invention are possible.

In a first variation, multiple layers of digital HDT, e.g., auxiliary data, are provided. A desirable enhancement of Digital HDT is the addition of layers that utilize different PN sequences so that different or independent auxiliary information can be hidden in the primary data signal for different decoders, or for the same decoder with different decoding PN sequences.

CTC can be used for embedding multiple layers of auxiliary digital data onto a host primary data signal. However, if the layers are encoded serially, it is possible that the encoding of the second layer following the first layer can compromise the integrity of (i.e., cause errors in) the first layer since, when encoding the first layer, only the minimum amount of energy is introduced to embed the auxiliary data bit. So any slight perturbation, e.g., adding another layer on top of the first layer, may compromise the integrity of the first layer. Therefore, when encoding multiple layers, it is desirable to optimize the layers jointly, i.e., at the same time.

A method for joint CTC is presented for the case of encoding two auxiliary data layers (layer A and layer B) in a common primary data signal. Layers A and B have different PN sequences, designated $PN_{1A}$ and $PN_{1B}$, respectively. Applying CTC to multiple layers is similar to the single layer case. To jointly optimize the layers, the following steps are executed for each auxiliary data bit ($D_i$):

1) Use two independent auxiliary data bits to modulate $PN_{1A}$ and $PN_{1B}$ to form $PN_{1A}'$ and $PN_{1B}'$, respectively.

2) Correlate the LPSBs with $PN_{1A}'$ and $PN_{1B}'$ to form the scalar CTC values for Layer A and Layer B, $CTC_A$ and $CTC_B$, respectively. Again, the CTC values range from −N to N, where N is the PN length 3) $CTC_A$ and $CTC_B$ are evaluated to determine the next steps. There are four possible cases:

Case 1: $CTC_A>0$ and $CTC_B>0$. The primary signal's LPSBs have the desired correlation with both $PN_{1A}'$ and $PN_{1B}'$—no further processing is needed for that frame. Skip to Step 6.

Case 2: $CTC_A>0$ and $CTC_B<=0$. $PN_{1A}'$ has the desired correlation with the primary signal's LPSBs, but $PN_{1B}'$ does not. Set F (number of bits to complement)= $|CTC_B|/2+1$. Proceed to Step 4.

Case 3: $CTC_A<=0$ and $CTC_B>0$. Similar to Case 2, $PN_{1B}'$ has the desired correlation with the primary signal's LPSBs, but $PN_{1A}'$ does not. Set $F=|CTC_A|/2+1$. Proceed to Step 4.

Case 4: CTCA<=0 and CTCB<=0. Neither PN1A', nor PN1B' has the desired correlation with the primary signal's LPSBs. Set F=(Max(|CTCA|, |CTCB|))/2+1. Proceed to Step 4.

4) Set PNSimilar=$PN_{1A}'$ ^ $PN_{1B}'$. This bitwise exclusive OR operation will produce a sequence (PNSimilar) that has 1's where the bits in sequences $PN_{1A}'$ and $PN_{1B}'$ are different and 0's where the bits are alike.

5) At this point in the processing, one or more of the CTC values are negative, that is, one of the layers is negatively correlated with the primary signal's LPSBs (referred to simply as 'LPSBs,' hereafter). The goal now is to modify suitable locations in the LPSBs, in order to produce the desired CTC value for both Layer A and Layer B.

A suitable methodology is to modify LPSBs so that $CTC_A$ and $CTC_B$ are jointly increased. The elements in PNSimilar that are 0 provide suitable positions where LPSBs can be modified to jointly increase $CTC_A$ and $CTC_B$. Recall that the elements of PNSimilar that are 0 correspond to the elements in $PN_{1A}'$ and $PN_{1B}'$ that are alike. Designate the locations where the PNSimilar is 0 as SuitableIndex. For example, if PNSimilar ∈ {$1_0,0_1,0_2,0_3,1_4,0_5, \ldots, 1_{N-3},0_{N-2},0_{N-1}$}, then SuitableIndex ∈ {$1,2,3,5,\ldots,N-2,N-1$}. Next, examine the candidate elements in LPSBs that can jointly increase $CTC_A$ and $CTC_B$. The positions of these elements are defined by SuitableIndex. For the example above, choose, e.g. randomly, from SuitableIndex a candidate, e.g. PNSimilar [3], correlate the LPSB[3] with the $PN_{1A}'$ [3] (or equivalently $PN_{1B}'$ [3]). If the correlation is positive, then nothing can be done to this LPSBs element that will jointly increase $CTC_A$ and $CTC_B$; proceed to the next suitable location for joint optimization. However, if the correlation is negative, then modify that element of LPSBs such that a positive correlation will result. In the case where the PN is binary, toggling the bit of LPSB would result in the desired correlation. Each time an element of LPSBs is modified in such a way, $CTC_A$ and $CTC_B$ are increased, and hence contribute to the desired correlation.

This process (of modifying the LPSBs) is repeated F times to ensure that LPSBs have the desired correlation with $PN_{1A}'$ $PN_{1B}'$, or equivalently to ensure that $CTC_A$ and $CTC_B$ are both positive.

6) Done. The desired correlation has been achieved for Layer A and Layer B.

The above scheme can be extended to cases of more than two layers, or cases where the PN sequences are other than binary.

In a second variation, an iterative decoder at the encoder is provided. An even more primitive method than CTC and Sparse PN methods for modifying bits is to iteratively try to modify the bits in order for it to decode properly. The encoder iteratively modifies the lower bits until it decodes properly. This iterative method randomly selects bits for modification.

In a third variation, spectrally-shaped Digital HDT is provided. In practice, few LPSBs need to be manipulated to guarantee the proper correlation with the desired symbol to transmit. As a result of the small number of bits needed for manipulation, there is a rich (e.g., large) population of bit combinations that can be used to guarantee proper correlation with the desired auxiliary bit. To lessen the distortion introduced by DHDT, the population of combinations can be searched to see which combination maximizes clarity of the primary signal.

To implement this for a primary data signal comprising audio data, for example, each combination is searched to see if it produces a spectral shape similar to the spectral shape of the primary signal. To measure the similarity, the mean square error in frequency domain can be used. The closest match is then selected for transmission. Other less exhaustive search methods are also possible.

In a fourth variation, fixed-frame signaling is provided. If frame synchronization can be achieved between the encoder and decoder by some other means, then the encoder and decoder can designate one bit out of each frame of samples of the primary data signal as a "data bit." The position of the data bit may vary from frame to frame. The synchronization of the bit position between the encoder and decoder can be controlled by a pseudo-random number, e.g., which is generated by a linear feedback shift register seeded with a primitive polynomial.

In a fifth variation, dynamic LPSB selection is provided. In general, the LSB in a sample of a large value (audio or video or other signals, in either compressed or uncompressed domain representation) is less perceptually important than the same LSB in a sample of small value. Therefore, the LPSB selection can be made dynamically by determining the dynamic range of the sample value, such as the absolute value or number of bits needed. For example, a range detector can be provided to determine if the LPSB should be 0 bits (no LSBs), 1 bit (one LSB), 2 bits (two LSBs) or more, for each sample. The decoder will be able to determine this as well without any side information because the dynamic range of the sample is not altered after DHDT encoding. Of course, a suitable limit should be applied so that an adequate number of LPSBs are available to encode DHDT data even through low amplitude sections of the signal.

In a sixth variation, perceptual based LPSB selection is provided. After the LPSBs are determined by a fixed method or a dynamic method, as above, a further adaptation is possible by intelligently selecting which of the chosen LPSBs will be modified in order to encode DHDT data with least amount of perceptual distortion. One method is to make the LPSBs that belong to the large sample values more frequently chosen for modification. For the following example, assume there is one bit of LPSB per sample, i.e., the least significant bit, therefore the modification is the same as flipping the LPSB bit, i.e., from 0 to 1, or from 1 to 0.

If, for a sample s(k), the sparse PN sequence 0<SPN(k)<1 indicates the selection strength or the probability of flipping its LPSB (e.g. 0 means no flipping, 1 means high probability of flipping), then the probability of flipping can be further modified by the dynamic range of the sample DR(k). DR(k) can be a function of the absolute value of the sample s(k) as a result of the range detection. Then the modified sparse PN sequence MSPN(k) can be a function of SPN(k) and DR(k). For example, MSPN(k)=SPN(k)*DR(k). One alternative is MSPN(k)=alpha*SPN(k)+beta*DR(k), where alpha and beta are parameters for the weighting the two values. Of course, a high value of MSPN(k) would not always flip LPSB(k), since the actual flipping depends on the CTC measurement and LPSB(k) value itself.

In a seventh variation, approximate spectral shaping is provided. In the absence of further adaptive processing, the embedded signal added to the host signal through LPSB modification has a white spectrum. Knowing that additive noise that is shaped like the host signal spectrum is less perceptible than an additive white noise, further steps can be taken to approximately shape the embedded signal. One such approach is to have the embedded signal acquire part of the phase information of the host signal. This can be accomplished approximately by increasing the probability that the LPSB modification adds when the sample value is positive, and subtracts when the sample value is negative.

For example, assuming the sample s(k) is in a two's complement binary format. If s(k)>0 and LPSB(k)=0, flip the LPSB(k) to 1, e.g., add 1 to s(k). To illustrate, if s(k)=$0100_2$ ($4_{10}$), where the subscripts denote binary and decimal numbers, respectively, change it to $0101$ ($5_{10}$).

If s(k)<0 and LPSB(k)=1, flip the LPSB(k) to 0, e.g., subtract 1 from s(k). To illustrate, if s(k)=$1101_2$ ($-3_{10}$), change it to $1100_2$ ($-4_{10}$)

In all other cases, skip LPSB(k) and move to the next candidate indicated by the sparse PN or the modified sparse PN sequence.

The above example makes a hard decision based on the sign of s(k), but a softer probabilistic decision can be incorporated if needed.

Appropriate modifications can be made to the embodiments illustrated in the figures to implement the above variations. For example, for dynamic LPSB selection, a range detector can be provided that determines the range of the primary signal, and provides an appropriate modification of the masking bit pattern.

For perceptual based LPSB selection, a function can be provided that determines the value (e.g., magnitude of each sample), and the probability of flipping bits (e.g., in FIG. 3) can be modified accordingly.

For approximate spectral shaping, a function can be provided that determines whether the original sample value is positive or negative, then adjusting the LPSBs accordingly. The values of neighboring samples (e.g., in a frame) may also be considered in adjusting the LPSBs of a current sample.

Although the invention has been described in connection with various specific embodiments, those skilled in the art will appreciate that numerous adaptations and modifications may be made thereto without departing from the spirit and scope of the invention as set forth in the claims.

What is claimed is:

1. A computerized method for embedding an auxiliary data bit in a plurality of digital samples, comprising the steps of:
   (a) modulating a pseudo-random sequence by the auxiliary data bit to provide a pseudo-randomly modulated auxiliary data sequence, said pseudo-random sequence comprising a plurality N of chips that are modulated by said auxiliary data bit; and
   (b) embedding the auxiliary data sequence in said plurality of digital samples by replacing at least one least perceptually significant bit (LPSB) of each of the plurality of digital samples according to the auxiliary data sequence to provide a composite signal with the auxiliary data bit embedded therein, a chip portion of the auxiliary data sequence modifying a corresponding LPSB of the samples; wherein:
   each digital sample comprises a plurality of bits; and
   a number of said LPSBs to replace in each of the digital samples is varied for different digital samples on an ongoing basis according to a desired perceptibility level of the auxiliary data sequence in the composite signal.

2. The method of claim 1, wherein:
   each digital sample comprises a plurality of bits; and
   the number of said LPSBs in the samples to replace according to the auxiliary data sequence is determined according to a desired bit error ratio of the auxiliary data bit.

3. The method of claim 1, wherein:
   in said embedding step, the auxiliary data sequence is embedded in sparsely-selected samples.

4. The method of claim 3, comprising the further step of:
   providing a sparse pseudo-random sequence for determining said sparsely-selected samples.

5. The method of claim 4, wherein:
   the sparse pseudo-random sequence is provided at a desired sparseness level to provide a noise power of the auxiliary data sequence in the composite signal at a desired level.

6. The method of claim 1, wherein:
   the digital samples comprise audio data; and
   a number of said LPSBs to replace in each of the digital samples is determined such that the auxiliary data sequence is provided at a desired audibility level in the composite signal.

7. The method of claim 1, wherein:
   the digital samples comprise video data; and
   a number of said LPSBs to replace in each of the samples is determined such that the auxiliary data sequence is provided at a desired visibility level in the composite signal.

8. The method of claim 1, wherein:
   the number of said LPSBs in the digital samples to replace according to the auxiliary data sequence is determined according to a value of the samples.

9. The method of claim 1, wherein:
   the number of said LPSBs in the digital samples to replace according to the auxiliary data sequence is determined according to a dynamic range of the digital samples.

10. The method of claim 1, wherein:
    the number of said LPSBs in a current one of the digital samples to replace according to the auxiliary data sequence is determined according to a value of at least one neighboring sample of the current digital sample.

11. The method of claim 1, comprising the further steps of:
    unpacking a first compressed bit stream to recover the digital samples for use in said step (a); and
    packing the digital samples with the auxiliary data sequence embedded therein to provide the composite signal as a second compressed bit stream.

12. A computerized method for embedding an auxiliary data bit in a plurality of digital samples, comprising the steps of:
    (a) modulating a pseudo-random sequence by the auxiliary data bit to provide a pseudo-randomly modulated auxiliary data sequence;
    (b) embedding the auxiliary data sequence in a first plurality of samples by replacing at least one least perceptually significant bit (LPSB) of each of the first plurality of samples according to the auxiliary data sequence to provide a composite signal with the auxiliary data bit embedded therein; wherein:
    each of the first samples comprises a plurality of bits; and
    a number of said LPSBs to replace in each of the first samples is varied for different samples on an ongoing basis according to a desired perceptibility level of the auxiliary data sequence in the composite signal;
    providing at least one check bit according to the auxiliary data;
    modulating the pseudo-random sequence by the at least one check bit to provide at least one pseudo-randomly modulated check bit sequence; and
    embedding the check bit sequence in a second plurality of digital samples by replacing at least one least perceptually significant bit (LPSB) of each of the second plurality of digital samples with a portion of the check bit sequence to provide said composite signal with the check bit sequence embedded therein; wherein:
    the check bit sequence is adapted to be used by a decoder in synchronizing with said pseudo-random sequence.

13. A computerized method for embedding an auxiliary data bit in a plurality of digital samples, comprising the steps of:
    (a) modulating a pseudo-random sequence by the auxiliary data bit to provide a pseudo-randomly modulated auxiliary data sequence; and
    (b) embedding the auxiliary data sequence in said plurality of digital samples by replacing at least one least perceptually significant bit (LPSB) of each of the plurality of digital samples according to the auxiliary data sequence to provide a composite signal with the auxiliary data bit embedded therein; wherein:
    each digital sample comprises a plurality of bits;
    a number of said LPSBs to replace in each of the digital samples is varied for different digital samples on an ongoing basis according to a desired perceptibility level of the auxiliary data sequence in the composite signal;

multiple layers of auxiliary data are embedded in said plurality of digital samples of the composite signal; and said embedding of multiple layers is optimized together for the plurality of embedded layers.

14. An apparatus for embedding an auxiliary data bit in a plurality of digital samples, comprising:

(a) a modulator for modulating a pseudo-random sequence by the auxiliary data bit to provide a pseudo-randomly modulated auxiliary data sequence, said pseudo-random sequence comprsing a plurality N of chips that are modulated by said auxiliary data bit; and (b) means for embedding the auxiliary data sequence in said plurality of digital samples by replacing at least one least perceptually significant bit (LPSB) of each of the plurality of digital samples according to the auxiliary data sequence to provide a composite signal with the auxiliary data bit embedded therein, a chip portion of the auxiliary data sequence modifying a corresponding LPSB of the samples; wherein:

each digital sample comprises a plurality of bits; and a number of said LPSBs to replace in each of the digital samples is varied for different digital samples on an ongoing basis according to a desired perceptibility level of the auxiliary data sequence in the composite signal.

15. An apparatus for embedding an auxiliary data bit in a plurality of digital samples, comprising:

(a) a modulator for modulating a pseudo-random sequence by the auxiliary data bit to provide a pseudo-randomly modulated auxiliary data sequence; and (b) means for embedding the auxiliary data sequence in a first plurality of samples by replacing at least one least perceptually significant bit (LPSB) of each of the first plurality of samples according to the auxiliary data sequence to provide a composite signal with the auxiliary data bit embedded therein; wherein:

each of said first samples comprises a plurality of bits; and a number of said LPSBs to replace in each of the first samples is varied for different samples on an ongoing basis according to a desired perceptibility level of the auxiliary data sequence in the composite signal.

(c) means for providing at least one check bit according to the auxiliary data;

(d) a modulator for modulating the pseudo-random sequence by the at least one check bit to provide at least one pseudo-randomly modulated check bit sequence; and (e) means for embedding the check bit sequence in a second plurality of digital samples by replacing at least one least perceptually significant bit (LPSB) of each of the second plurality of digital samples with a portion of the check bit sequence to provide said composite signal with the check bit sequence embedded therein; wherein:

the check bit sequence is adapted to be used by a decoder in synchronizing with said pseudo-random sequence.

16. An apparatus for embedding an auxiliary data bit in a plurality of digital samples, comprising:

(a) a modulator for modulating a pseudo-random sequence by the auxiliary data bit to provide a pseudo-randomly modulated auxiliary data sequence; and (b) means for embedding the auxiliary data sequence in said plurality of samples by replacing at least one least perceptually significant bit (LPSB) of each of the plurality of samples according to the auxiliary data sequence to provide a composite signal with the auxiliary data bit embedded therein; wherein:

each sample comprises a plurality of bits;

a number of said LPSBs to replace in each of the samples is varied for different samples on an ongoing basis according to a desired perceptibility level of the auxiliary data sequence in the composite signal;

multiple layers of auxiliary data are embedded in said plurality of samples of the composite signal; and said embedding of multiple layers is optimized together for the plurality of embedded layers.

* * * * *